United States Patent [19]

Huddleston et al.

[11] Patent Number: 4,687,794
[45] Date of Patent: Aug. 18, 1987

[54] NOVEL SYSTEM FOR PREPARING RUBBER COMPOSITIONS EMPLOYING A CAVITY TRANSFER MIXER

[75] Inventors: Elwyn Huddleston, Franklin, Ky.; Richard J. Lacana, Walpole, Mass.

[73] Assignee: The Kendall Company, Boston, Mass.

[21] Appl. No.: 892,677

[22] Filed: Aug. 1, 1986

[51] Int. Cl.$^4$ ................................................ C08J 3/22
[52] U.S. Cl. .................................... 523/351; 366/302; 366/303; 366/305; 524/270

[58] Field of Search ................ 523/351; 524/270, 271, 524/272, 273, 274; 366/302, 303, 305

Primary Examiner—Paul R. Michl
Attorney, Agent, or Firm—Alvin Isaacs

[57] ABSTRACT

Novel process for preparing rubber-based compositions, e.g. adhesive formulations including natural and/or synthetic rubber and a quantity of tackifier resin for increasing adhesion, wherein said resin is incorporated in the composition via a cavity transfer mixer.

20 Claims, No Drawings

NOVEL SYSTEM FOR PREPARING RUBBER COMPOSITIONS EMPLOYING A CAVITY TRANSFER MIXER

BACKGROUND OF THE INVENTION

Various rubber-based compositions commercially available on the market today require the presence of at least one tackifying resin to increase adhesion. Such resins will be referred to hereinafter for simplicity as "tackifiers".

Since the invention is particularly directed to rubber-based adhesives, e.g. pressure-sensitive adhesive coatings and the like, the nature and objects of the invention will be described for purposes of illustration by reference thereto.

In general, rubber-based adhesives may be classified broadly as either natural rubber or synthetic rubber, e.g. butyl rubber. Natural rubber adhesives are the more common, employed in various products such as finger bandages, or surgical adhesive tapes, industrial tapes and the like. Synthetic rubbers such as butyl rubbers are commonly employed in industry for such uses as pipe-wrap tapes for protecting pipelines against corrosion, etc.

Common to both types of rubber is the initial step of mixing chunks of the rubber with other ingredients of the mix (fillers, antioxidants, plasticizers and the like) in an internal mixer, e.g. a Banbury, to provide a molten "premix" which is then transported from the Banbury for further processing.

With respect to natural rubber adhesives, it would he most desirable from a manufacturing standpoint also to incorporate all of the needed tackifier in the Banbury or other internal mixer, thereby admixing all of the ingredients in single processng step. However, it is not possible to do so. While it is entirely possible to incorporate a portion of the required tackifier in the Banbury (as seen from the illustrative example that follows), attempts to add all of the required amount of tackifier in this manner result in a mixture so adhesive in nature that it cannot be dropped from the mixer. The only non-solvent procedure known commercially to incorporate the tackifier is on a mill. Consequently, commercial processes for preparing natural rubber adhesives in a solid state prepare an initial natural rubber premix in a Banbury or other internal mixer and then transport the premix to a milling operation where the resin is scooped or shoveled onto a two-mill roll where it is mixed into the premix, for, say, 10-30 minutes to prepare the adhesive formulation.

Following the milling operation, the adhesive formulation may then be transported to the final steps of the manufacturing process. For example, it may be transported to a calendering operation for coating onto a backing material to prepare an adhesive tape.

Apart from the disadvantages inherent in such a batch process, the necessity to employ a mill has its own inherent disadvantages. A conventional two-roll mill for this purpose may be on the order of five feet or more in length and takes up a considerable amount of space in the manufacturing process. Manpower is required to apply the resin and supervise the milling operation. Resin gets on the floor, sticks to one's shoes and creates environmental problems. Finally, there is the safety factor. While serious plant injuries are few, by far the most prevalent cause of those which do occur is the milling operation. Because of human error, a worker may on occasion get an arm caught in the mill, resulting in extremely serious and often tragic injury.

Synthetic rubber adhesives may be made by the same general process. For example, in the earliest production of butyl adhesives, the initial premix of the rubber components, e.g. virgin butyl, halogenated butyl and/or reclaimed butyl rubber was first made in the Banbury and then transported to the two-roll mill for incorporation of the tackifiers. Subsequently, this process was modified to incorporate the tackifiers in the Banbury. While this eliminated the step of adding the tackifier at a second (milling) station, it also had certain inherent disadvantages. The tackifiers had to he incorporated sequentially, rather than incorporating all at once (typically three stages) and the output time was materially lengthened. Consequently, to increase output it was found necessary to add additional Banbury mixers which occupy a large amount of space and at present require a capital expenditures of on the order of $2,000,000.

To summarize, natural and certain synthetic rubber adhesives require a milling step to add the tackifiers. Butyl and certain other synthetic rubber adhesives can be prepared by incorporating the tackifier in the Banbury. However, the output is slow and a better way (other than milling) is extremely desirable in commercial production.

The task of this invention can accordingly be said to be to devise a better system for incorporating tackifiers into adhesives such as the heretofore described rubber-based adhesives.

BRIEF DESCRIPTION OF THE INVENTION

In accordance with the present invention, the aforementioned objectives are accomplished by employing a cavity transfer mixer (CTM) of per se known description for incorporating the tackifier(s). For reasons to be described in more detail hereinafter, the CTM is preferably a variable speed design which is equipped with multiple ports for introducing the resin.

DETAIL DESCRIPTION OF THE INVENTION

Cavity transfer mixers are per se old and have been employed in various mixing operations, none of which is suggestive of the use contemplated by the present invention, nor of the advantages obtained thereby.

In general, cavity transfer mixers are a form of extruder mixer wherein material is fed into one end and exits through an extruder die at the opposed end. They consist essentially of a hollow cylindrical stator member and a cylindrical rotor member which is rotatable therewithin. The facing cylindrical surfaces on the rotor and stator carry respective pluralities of rows of grooves or cavities positioned so as to cause a mixing as the material traverses the mixer.

British Specification No. 930,339 describes a cavity transfer mixer of this description wherein the grooves are elongate and longitudinally extending. The rows of grooves on each member extend peripherally around the member and are spaced apart axially, the rows on one member being axially offset from the rows on the other member so as to provide an axial overlap of the grooves in adjacent rows on the stator and rotor. Because of this arrangement of overlapping closed cavities on the rotor and stator, material passing through this mixer must travel a path which alternates between rotor and stator cavities. Where a cavity on one member happens to be opposite a land on the other member, the material to be admixed is subjected to simple shear so that it is cut in half before being displaced approximately at right angles to its original direction as it passes into the next cavity.

U.S. Pat. No. 4,419,014 relates to an improved CTM which is particularly efficacious in the practice of the present invention. In accordance with this patent, the rotor and stator cavities are formed as hemispheres arranged in a special configuration. Specifically, these hemispherical cavities are arranged in parallel rows on the rotor and stator such that: (a) the cavities in adjacent rows on the strator are circumferentially offset; (b) the cavities in adjacent rows on the rotor are circumferentially offset; and (c) the rows of cavities on the stator and rotor are axially offset, whereby an overall increase in mixing capacity for the same surface area can be obtained while achieving a desired exponential mixing characteristic which simple shear mixing is repeatedly interrupted by cutting and turning stages.

The CTM disclosed in the aforementioned U.S. Patent is appreciably more efficient than that described in the British Patent. Specifically, the mixing capacity for the surface area is considerably increased. Moreover, other significant advantages are obtained. The configuration of hemispherical cavities can be arranged so that overlaps occur between three cavities at any give time so that extra mixing or blending is obtained by repeated division of the melt streams. The hemispherical shape of the cavities provides excellent streamlining so that, for example, stagnation will not occur. Other advantages are described in Col. 3.

The copending application of Elwyn G. Huddleston, Ser. No. 857,692 filed Apr. 29, 1986 and assigned to the assignee of the instant application describes and claims a novel system for incorporating a rubber crosslinking agent in a rubber-based adhesive formulation wherein the crosslinking agent is admixed with the adhesive formulation in a cavity transfer mixer, e.g. a CTM of the type disclosed in the aforementioned U.S. Pat. No. 4,419,014, thereby providing significant manufacturing advantages. Preferably the crosslinker is incorporated in an oil or plastisizer vehicle. As described in the copending application, a premix of the rubber and other components is first formed in a Banbury in a batch operation. The premix is then transported to the input end of the extruder, to the output end of which the CTM is positioned. The CTM is provided near its leading end with an injection port through which the crosslinking agent is fed. As is discussed, the CTM may he threaded onto the exit end of the extruder or otherwise secured to the extruder. Alternatively, it may be a separately driven, variable speed CTM mounted or secured contiguous with the exit port of the extruder, e.g. by clamping means. In the latter embodiment, the CTM may have a diameter significantly greater than the extruder, thereby providing greater surface area for mixing in the CTM, which in turn allows the addition of larger quantities of additives, i.e. increases output.

Preferably, the process is operated as a continuous one where the premix from the Banbury drops directly into a continuously operating extruder and metered amounts of crosslinker are automatically fed into the CTM with the aid of per se known microprocessors. In other words, since the amount of premix exiting from the Banbury in a given batch time, e.g. 10 minutes is known, as is the rate of passage of the premix through the extruder, the required amount of crosslinker to be admixed can be determined and automatically metered into the CTM as the premix is continuously fed therethrough.

In this manner, employing a CTM in lieu of the 84 inch two-roll mill, a homogeneous adhesive mixture containing the crosslinker is instantaneously obtained and this premix may be immediately conveyed to a calender where the adhesive is applied to a suitable backing material to form an adhesive tape.

The present invention is predicated mainly upon the discovery that the CTM, e.g. a CTM as described above, can be employed to incorporate tackifiers into adhesive formulations.

As mentioned previously, the present invention is particularly directed to rubber-based adhesives. Accordingly, the following detailed description will primarily he devoted to the rubber adhesive art.

The earliest rubber adhesives were merely simple solutions of unmodified natural rubber. With the impetus of technological needs occasioned by World War II and the development of synthetic elastomers, new types of adhesives appeared for application to a broader range of substrates. Currently, rubber-based adhesives may contain a wide variety of component materials, such as elastomers, resins or tackifiers, fillers, plasticizers and softeners, antioxidants, curing agents, sequestering agents, biocides, etc.

The elastomer may be defined as polymeric materials having rubberlike properties. More specifically, an elastomer is a natural or synthetic polymer which exhibits high extensibility and quick, forceful recovery. Examples of those polymers which function as base elastomers in adhesive applications include natural rubber, cyclized rubber, styrene-butadiene copolymer (SBR), acrylonitrile-butadiene copolymer (NBR), chlorinated rubber, polychloroprene (neoprene), rubber hydrochloride, polysulfide rubber, carboxylic elastomers, silicone rubber, polyurethane rubber (isocyonate) acrylonitrile-butadiene-styrene copolymers (ABS), reclaimed rubber, butyl rubber, polyisoprene (synthetic natural rubber), polyisobutylene, epichlorohydrin homopolymer rubber, epichlorohydrin-ethylene oxide copolymer rubber, and ethylene-propylene-diene monomer terpolymer rubber (EPDM).

In the formulation of early rubber-based adhesives, it was soon learned that a simple system consisting of elastomer or rubber material alone gave only marginal performance as a finished adhesive. Modifiers were needed to contribute improvements in the adhesive performance. A wide variety of modifier resins, selected to be compatible valuable adjuncts as tackifiers, i.e. to improve tack or instantaneous adhesiveness.

Although natural rubber possesses tack characteristics, the hold strength developed by rubber alone is generally inadequate for many uses. On the other hand, most commercially available synthetic elastomers have little tack, either for themselves or for other surfaces. Accordingly, tackifiers in the form of resins are added to these systems to increase their tack properties.

Tackifiers are represented by a variety of resins of many chemical types and physical properties. The materials are generally thermoplastic and typically form amorphous glasses at room temperature. They are available in a wide range of softening points, from liquids at room temperature to hard, brittle solids melting up to 190° C. They are usually quite soluble in aliphatic and aromatic hydrocarbons, as well as many other typical organic solvents. Tackifiers commonly exhibit molecular weights from 200 to 1500 and structures that are large and rigid.

Typical illustrative resins that are marketed to the adhesive industry as tackifiers include the following: Rosins such as gum, wood or tall oil rosin; modified rosins, e.g. polymerized rosin or hydrogenated rosin; rosin esters such as pentaerthritol-wood rosin, glycerine-hydrogenated rosin, glycerine-highly stabilized rosin; pentaerthritol-highly stabilized rosin and hydroabietyl phthalate; polymerized petroleum hydrocarbons, e.g. cycloaliphatic hydrogenated oelefins, olefins, alphatic petroleum hydrocarbons, modified aromatic hydrocarbons, dicyclopentadiene, mixed olefins, alkyl-aromatic petroleum hydrocarbons, modified aromatic hydrocarbons; polymerized terpenes such as alpha-pinene, d-limonene, beta-pinene, terpene, etc; miscellaneous resins such as alpha-methyl styrene-vinyltoluene, alpha-methyl styrene, styrene, terpene phenolic, coumarone-indenes, etc; and metallic resinates such as mixed calcium/zinc (e.g. Pexate 329, Pexate 549, Zitro, Zirex or Zinar) and zinc resinates such as Pexate 511, Pexate 510E or Pexate 508E), etc.

As previously noted, the adhesive formulation may typically include other materials performing specific desired functions.

As illustrations of such other materials in rubber mix, mention may be made of fillers such as carbon black, zinc oxide, clays, chalk, whitings, calcium silicate, barium sulfate and the like in order to reduce the cost, increase the specific gravity, or raise the viscosity; plasticizers and softeners such as mineral oil, lanolin, etc; antioxidants, e.g. aromatic amine antioxidants, substituted phenols, hydroquinone (p-dihydroxylbenzene), etc.; curing agents such as sulfur, organic peroxides, and the like; accelerators; sequestering agents; biocides such as bactericides, etc.

In the broadest aspect, the present invention is directed to novel procedures for preparing rubber-based compositions containing natural rubber, synthetic rubber or a mixture of both and which further include a predetermined amount of at least one tackifying resin, wherein various components of the composition are first admixed to form what may be termed an "adhesive premix" to which at least a portion of the tackifying resin (or "tackifier") is then incorporated in a separate mix operation, the essence of the invention being incorporating the tackifier (or the needed additional amount of tackifier) in a CTM, e.g. as previously described. Thus, the milling operation for incorporating tackifer is replaced by a CTM which is typically only several inches in length and hardly noticeable.

While not limited to rubber-based adhesives, the present invention is particularly directed thereto in order to provide a manufacturing process which obviates the heretofore described problems and disadvantages in current production systems for manufacturing both natural and synthetic rubber-based adhesives.

Accordingly, for purposes of illustration, the most preferred embodiments of this invention will hereinafter be described in detail with reference to rubber-based adhesives.

In the preferred embodiments, all of the components of the adhesive formulation except for the required amount of tackifer are first admixed in an internal mixer, most preferably a Banbury, in per se known manner to provide a substantially homogenous molten premix of the rubber and other components (filler, antioxidant, etc.)

The molten premix is then transported from the Banbury or other internal mixer to the CTM for the addition of the tackifier. Preferably, this is accomplished in a continuous rather than a batch operation wherein the premix is dropped from the internal mixer discharge hopper directly into the input end of a conventional extruder. The CTM is mounted or secured adjacent to the output end of the extruder so that the premix is conveyered to the CTM via the extruder.

In theory, the CTM may be threaded onto the output end of the extruder. Theoretically, the CTM may also be provided with a single port through which the resin is introduced. Both of these designs have utility for purposes of this invention. However, the usefulness of either or both of these constructions is limited from a manufacturing standpoint and consequently they are not preferred, at least with most adhesive systems which are contemplated.

For example, experiments have shown that when a 6 row CTM was fitted directly with a Davis Standard 16:1 cold feed extruder, a maximum amount of about 5-6 percent resin can be incorporated. While this percentage of tackifier may be entirely adequate for some adhesives, higher amounts of this additive to the premix are required for adhesive formulations generally envisioned by this invention.

In the preferred aspect of this invention, the CTM is accordingly detached from the extruder, and is independently driven so as to be capable of operating at variable speeds, including speeds appreciably higher than the extruder. In this manner, much greater quantities of resin may be incorporated, i.e. quantities typical of these commonly employed in the contemplated adhesives. It will of course be appreciated that where the CTM is detached and separately driven (as distinguished from being threaded to the extruder), it should nevertheless be mounted in juxtaposition with the extruder (by any per se known mechanical means) so that the molten mass of premix passes directly from the extruder to the CTM.

It has further been found that optimum results may be obtained by increasing the length of the CTM, e.g. to provide a nine row CTM. This may he accomplished simply by providing a single nine row CTM. Alternatively, it may be by means of a variable length CTM, e.g. two or more separate units in sealed relationship to prevent escape of material traveling downstream from one CTM to the next.

By way of illustration, a three row CTM may be fitted directly to a cold feed extruder, e.g. to the output end of a 2½" extruder. A 6 row variable speed, separately driven CTM may be placed in sealed relationship with the 3 row CTM.

As mentioned earlier, the CTM may theoretically be provided with a single entry port for feeding the resin. This may be entirely adequate for some production runs, particularly where smaller quantities of resin are to be incorporated.

However, in the preferred embodiment of this invention, multiple ports are provided along the path (length) of the CTM. By way of illustration, in the embodiment just described employing a 9 Row CTM, excellent results were obtained employing two entry ports for the resin. For example, with a nine row CTM in which the last six rows were driven independently, e.g. a 3-4 times the speed of the main extruder, two injection ports were found to be adequate for the addition of up to 23% hot resin.

Preferably, however, a 9 row unit entirely driven independently, will be provided with three spaced ports for injecting the resin, e.g. a first one just before the CTM, a second one at the 3 row position, and a third one at the six row position. It should be however noted, that it will not always be necessary to inject at all three positions. Nevertheless, the use of three ports will provide greater flexibility for the system.

The foregoing is by way of illustration only. While entirely adequate for blending the required amounts of resin in both natural and butyl rubber adhesives, it will be appreciated that one following the teachings of this invention may choose to modify the length of the CTM and/or the number of injection ports.

It should, however, be noted that the ability to raise or lower the speed of the CTM may provide equivalent results to a variable length CTM without additional cost for increasing the length.

The following examples show by way of illustration and not by way of limitation the practice of this invention.

EXAMPLE 1

The following ingredients were incorporated into a Banbury to provide a substantially homogeneous natural rubber premix:

| | |
|---|---|
| Natural Rubber (Smoked Sheet) | 193.0 lbs. |
| White Pigment (Titanox 2010) | 5.0 lbs. |
| Black Pigment (Butex) | 7.0 ozs. |
| Phenolic Resin Crosslinker (SP-1055) | 8.0 ozs. |
| Kaolin Soft Clay (McNamee Clay) Filler | 164.0 lbs. |
| Antioxidant | 2.5 lbs. |
| Modified Tall Oil Rosin Tackifier | 68.0 lbs. |
| Zinc Oxide | 9.0 lbs. |
| Approx. | 442.0 lbs. |

An existing 3 Row CTM was fitted directly with a Davis Standard 16:1 cold feed extruder. An existing 6 Row CTM was then fitted to a drive shaft capable of being driven from a 1½" Prodex extruder. An exit sleeve was constructed between the 6 Row CTM and the Prodex barrel. An injection port was provided just prior to the output end of the 2½" extruder, i.e. just before the 3 Row CTM; and a second injection port was provided between the 3 Row and 6 Row CTMs. The extruder and CTM's were set for 160° C. (320° F.). The speed 2½" extruder was set at about 10 RPM; and the speed of the separately driven 6 Row CTM was set at about 80-90 RPM. The premix from the Banbury was fed into the extruder and resin STA TAC B (trademark of Reichhold Co. for a polymerized petroleum hydrocarbon tackifier) was pumped into the two injection ports at a speed of about 137.5 g/min to provide a natural adhesive mix output at the rate of 36 kg/hr and which contained about 22.9% by weight.

EXAMPLE 2

The following ingredients were incorporated in a Banbury to provide substantially homogeneous butyl rubber premix comprising:

| | |
|---|---|
| Butyl Rubber | 76.0 lbs. |
| Reclaimed Butyl Rubber | 145.0 lbs. |
| Indopol H-100 (polybutene tackifier) | 63.5 lbs. |

-continued

| | |
|---|---|
| McNamee Clay | 220.0 lbs. |
| Antioxidant (Agerite Stalite S) | 2.5 lbs. |
| Approx. | 507.0 lbs. |

An extruder, 3 Row CTM and 6 Row CTM construction as described in Example 1 was employed. However, the 2½" extruder was set at 14 RPM and the separately driven 6 Row CTM at 50 RPM (approximately 3.5 times faster than the extruder.) The butyl premix was fed into the extruder and Piccopale 100 (trademark of Hercules Co., for a aliphatic hydrocarbon tackifier resin) was pumped into the two injection ports at a speed of about 115 g/min to provide a butyl rubber adhesive mix output at the rate of 40.4 kg/hr and which contained about 17% resin by weight.

In the foregoing illustrative examples, it will be seen that, in each instance, a portion of the desired amount of tackifier was incorporated in the Banbury, the remainder being added in the CTM. It is to be noted, however, that it is entirely possible to incorporate substantially all of the resin and plasticizer via the CTM. In order to do so, a somewhat longer CTM may be needed. As will be appreciated by those skilled in the art, however, it may be expedient or advisable to incorporate at least plastisizing amounts of resin in the Banbury mix.

The adhesive formulations prepared above were calendered onto backings in known manner to prepare adhesive tapes which were then compared to adhesive properties with control tapes of similar formulations prepared in the conventional (prior) manner. The adhesive properties of the test tapes were comparable and well within the prescribed limits.

From the foregoing illustrative examples it will be seen that the present invention provides an elegant manufacturing process for preparing rubber-based adhesives comparable in adhesive characteristics to those prepared by the prior art systems commonly employed. In other words, the adhesives so produced by the present invention are not necessarily better. However, the manufacturing process is vastly superior.

To recapitulate, the present invention eliminates the need for the bulky milling operation and the various disadvantages inherent therein. Moreover, when employing a mill for mixing the resin, the process is of necessity a batch operation wherein a batch of the premix from the Banbury is transported to the mill where a batch of the premix and a quantity of resin are admixed for a period of time, e.g. 10-30 minutes. Moreover when the premix is prepared in the Banbury faster than the batch mixing in the mill can take place, it is often necessary first to place the premix on a warm-up mill before adding the resin.

In contradistinction, the present intervention utilizes a CTM for admixing the resin and which is only several inches in length and consequently is not even noticeable to the casual observer. Moreover, the present invention is readily adaptable to and most preferably employed in a continuous operation which not only increases production but materially reduces manufacturing costs in terms of manpower energy and space. In such a continuous process, the premix, e.g. from the Banbury, drops directly into a continuously operating extruder and metered amounts of molten (heated) resin are automatically pumped with the aid of per se known microprocessors for admixture in the CTM. In other words, since the amount of premix exiting from the Banbury in a given time, e.g. ten minutes is known, as is the rate of passage of the premix through the extruder, the required amount of resin to be admixed can be readily determined and automatically metered as the premix is continuously fed through the CTM.

Following exit from the CTM, the resulting adhesive composition may then be subjected to the final steps in the manufacturing process in known manner. For example, where an adhesive mass or mastic is contemplated, it may then be transported to the usual packaging stations. Where a tape, e.g. a pressure-sensitive tape is contemplated, it may then be transported to a calendering station where it is coated onto a suitable backing materials. Following the calendering operation, the tape may be cooled, slit into desired widths, taken up on a core to provide rolls of desired length and width and packaged, all in per se known manner.

In the preceding description, the invention has been described in detail by reference to the manufacture of rubber-based adhesives. It is to be expressly understood, however, that although the invention is particularly concerned with the manufacture of rubber-based adhesives, it is not restricted thereto, but is in fact applicable to the incorporation of resins in rubber formulations in general.

For example, it may be employed in the preparation of such diverse rubbery articles such as tires, tubes, membranes, e.g. EPDM roofing membranes, etc.

It may also be employed in the preparation of adhesives heretofore employed by solvated procedures e.g. solution chemistry.

By way of illustration, it may be employed in the preparation of acrylic adhesives. Typically, acrylics are prepared in a batch process commencing with the aqueous or solution polymerization of the acrylics. They are then coagulated, dried and extruded to provide a hot, sticky mass which is then admixed with the resin in a suitable solvent, all in a batch operation. In accordance with the present invention, the extruded mass of acrylic adhesive may be continuously admixed with the resin in a CTM (as described above) in lieu of in solution.

Since certain changes may be made without departing from the scope of the invention herein described, it is intended that all matter contained in the foregoing description, including the examples, shall be taken as illustrative and not in a limiting sense.

What is claimed is:

1. Process for preparing a rubber composition including at least one tackifying resin wherein components of said composition are first incorporated to form a rubber premix, and said tackifying resin is then incorporated in said premix in a separate mixing operation; the improvements wherein said tackifying resin is incorporated in said premix in a cavity transfer mixer to form said rubber composition.

2. A process as defined in claim 1 wherein said resin is incorporated in said cavity transfer mixer in its molten form.

3. A process as defined in claim 1 wherein said cavity transfer mixer consists essentially of a hollow cylindrical stator member and a cylindrical rotor member rotatable therewithin, the facing cylindrical surfaces on said rotor and stator carrying respective pluralities of cavities positioned so as to cause a mixing as the material traverses the mixer from the entry port thereof to the exit port thereof, said cavities being hemispherical and arranged in parallel rows on said rotor and stator such that: a. the cavities in adjacent rows on said stator are circumferentially offset; b. the cavities in adjacent rows on said rotor are circumferentially offset; and c. the rows of the cavities on said rotor and stator are axially offset, whereby an overall increase in mixing capacity for the same surface area is obtainable while achieving a desired exponential mixing characteristic in which simple shear mixing is repeatedly interrupted by cutting and turning stages.

4. A process as defined in claim 2 wherein said cavity transfer mixer is provided with a plurality of openings along its length for introducing said tackifying resin.

5. A process as defined in claim 1 wherein said premix is formed in an internal mixer.

6. A process as defined in claim 5 wherein said internal mixer is a Banbury.

7. A process as defined in claim 1 wherein said rubber composition is an adhesive.

8. A process as defined in claim 7 wherein said adhesive comprises natural rubber.

9. A process as defined in claim 7 wherein said adhesive comprises synthetic rubber.

10. A process as defined in claim 9 wherein said synthetic rubber is butyl rubber.

11. Process for preparing an adhesive composition including at least one tackifying resin wherein components of said composition are first incorporated to form a rubber premix, and said tackifying resin is then incorporated in said premix in a separate mixing operation; the improvements wherein said tackifying resin is incorporated in said premix in a cavity transfer mixer to form said adhesive composition.

12. A process as defined in claim 1 wherein said resin is incorporated in said cavity transfer mixer in its molten form.

13. A process as defined in claim 1 wherein said cavity transfer mixer consists essentially of a hollow cylindrical stator member and a cylindrical rotor member rotatable therewithin, the facing cylindrical surfaces on said rotor and stator carrying respective pluralities of cavities positioned so as to cause a mixing as the material traverses the mixer from the entry port thereof to the exit port thereof, said cavities being hemispherical and arranged in parallel rows on said rotor and stator such that: a. the cavities in adjacent rows on said stator are circumferentially offset; b. the cavities in adjacent rows on said rotor are circumferentially offset; and c. the rows of the cavities on said rotor and stator are axially offset, whereby an overall increase in mixing capacity for the same surface area is obtainable while achieving a desired exponential mixing characteristic in which simple shear mixing is repeatedly interrupted by cutting and turning stages.

14. A process as defined in claim 2 wherein said cavity transfer mixer is provided with a plurality of openings along its length for introducing said tackifying resin.

15. A process as defined in claim 1 wherein said premix is formed in an internal mixer.

16. A process as defined in claim 5 wherein said internal mixer is a Banbury.

17. A process as defined in claim 1 wherein said adhesive composition is a rubber-based adhesive.

18. A process as defined in claim 7 wherein said adhesive comprises natural rubber.

19. A process as defined in claim 7 wherein said adhesive comprises synthetic rubber.

20. A process as defined in claim 9 wherein said synthetic rubber is butyl rubber.

* * * * *